(12) United States Patent
Iwanaga et al.

(10) Patent No.: US 6,977,066 B1
(45) Date of Patent: Dec. 20, 2005

(54) METHOD FOR PRODUCING CHLORINE

(75) Inventors: Kiyoshi Iwanaga, Chiba (JP); Tetsuya Suzuta, Ichihara (JP); Yasuhiko Mori, Niihama (JP); Masayuki Yoshii, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/889,625

(22) PCT Filed: Jan. 19, 2000

(86) PCT No.: PCT/JP00/00210

§ 371 (c)(1),
(2), (4) Date: Jul. 19, 2001

(87) PCT Pub. No.: WO00/43313

PCT Pub. Date: Jul. 27, 2000

(30) Foreign Application Priority Data

Jan. 22, 1999 (JP) ............................... 11-014236

(51) Int. Cl.⁷ ............................................. C01B 7/04
(52) U.S. Cl. ..................................... 423/502; 423/507
(58) Field of Search ................................. 423/502, 507

(56) References Cited

U.S. PATENT DOCUMENTS

| | | | |
|---|---|---|---|
| 3,544,274 A | | 12/1970 | Van Dijk et al. |
| 4,188,184 A | * | 2/1980 | Fornoni ........................ 432/13 |
| 4,299,977 A | * | 11/1981 | Kuhlmann et al. .......... 562/416 |
| 4,589,215 A | * | 5/1986 | Iwasaki et al. ............... 34/182 |
| 4,774,070 A | * | 9/1988 | Itoh et al. ..................... 423/502 |
| 4,822,589 A | * | 4/1989 | Kiyoura et al. .............. 423/502 |
| 5,639,436 A | | 6/1997 | Benson et al. ............... 423/502 |
| 5,707,919 A | * | 1/1998 | Miyata et al. ............... 502/319 |
| 5,871,707 A | * | 2/1999 | Hibi et al. .................... 423/502 |
| 5,908,607 A | | 6/1999 | Abekawa et al. ........... 423/502 |

FOREIGN PATENT DOCUMENTS

| | | |
|---|---|---|
| EP | 0 761 593 A1 | 3/1997 |
| EP | 0 761 594 A | 3/1997 |
| EP | 761593 | 3/1997 |
| EP | 0 861 803 A1 | 9/1998 |
| EP | 861803 | 9/1998 |
| EP | 0 936 184 A2 | 8/1999 |
| HU | P0105207 A | 4/2002 |
| JP | 09-118503 | 5/1997 |
| JP | 10-194705 | 7/1997 |
| JP | 10-15389 | 1/1998 |
| WO | 97/11026 | 3/1997 |
| WO | WO 0043313 A1 | 7/2000 |

* cited by examiner

Primary Examiner—Ngoc-Yen Nguyen
(74) Attorney, Agent, or Firm—Sughrue Mion, PLLC

(57) ABSTRACT

A process for producing chlorine comprising the step of oxidizing hydrogen chloride in a gas containing hydrogen chloride with a gas containing oxygen in the presence of a catalyst, wherein the oxidation of hydrogen chloride is carried out in at least two reaction zones each comprising a catalyst-packed layer, which are arranged in series, and a temperature in at least one of said reaction zones is controlled with a heat exchange system. According to this process, the stable activity of the catalyst is maintained and chlorine can be stably obtained at a high yield since the excessive hot spot in the catalyst-packed layer is suppressed and the catalyst-packed layer can be effectively used.

12 Claims, No Drawings ed States Patent
METHOD FOR PRODUCING CHLORINE

FIELD OF THE INVENTION

The present invention relates to a process for producing chlorine. In particular, the present invention relates to a process for producing chlorine comprising oxidizing hydrogen chloride in a gas containing hydrogen chloride with a gas containing oxygen.

BACKGROUND ART

Chorine is a useful raw material for the production of vinyl chloride, phosgene, etc. and it is well known that chlorine is obtained through the oxidization of hydrogen chloride. For example, a process comprising catalytically oxidizing hydrogen chloride with molecular oxygen in the presence of a catalyst to obtain chlorine is known. With this process, a copper base catalyst, which is called a Deacon catalyst, is known to have a good catalytic activity, and various Deacon catalysts comprising copper chloride, potassium chloride and various kinds of compounds as third components are proposed. Besides the Deacon catalysts, processes using chromium oxide or its compound, or a ruthenium oxide or its compound, as a catalyst are also proposed.

However, since the oxidation reaction of hydrogen chloride is an exothermic reaction with 59 kJ/mol-chlorine, it is important to suppress excessive hot spot in a layer packed with the catalyst from the viewpoint of reducing the thermal degradation of the catalyst and maintaining the stability and easiness of operation. Furthermore, the excessive hot spot may induce a runaway reaction in the worst case, or the high temperature gas corrosion of a reactor material may be caused with hydrogen chloride and/or chlorine.

"Catalyst" Vol. 33, No. 1 (1991) describes that, in the reaction of pure hydrogen chloride with pure oxygen in the presence of chromium oxide as a catalyst, it is difficult to remove the hot spot in a fixed bed reaction system, and that it is necessary to use a fluidized bed reactor in a practical apparatus.

DISCLOSURE OF INVENTION

Under such circumstances, one object of the present invention is to provide a process for producing chlorine comprising oxidizing hydrogen chloride in a gas containing hydrogen chloride with a gas containing oxygen, in which the stable activity of the catalyst is maintained by suppressing the excessive hot spot in the catalyst-packed layer and making effective use of the catalyst-packed layer, and which is very advantageous from the viewpoint of a catalyst cost, an equipment cost, an operation cost, and the stability and easiness of the operation.

According to the present invention, this object can be achieved by a process for producing chlorine comprising the step of oxidizing hydrogen chloride in a gas containing hydrogen chloride with a gas containing oxygen in the presence of a catalyst, wherein the oxidation of hydrogen chloride is carried out in at least two reaction zones each comprising a catalyst-packed layer, which are arranged in series, and a temperature in at least one of said reaction zones is controlled with a heat exchange system.

EMBODIMENTS FOR CARRYING OUT THE INVENTION

As a gas containing hydrogen chloride to be used in the present invention, any gas containing hydrogen chloride, that is generated through a pyrolysis or combustion reaction of chlorine-containing compounds, a phosgeniting dehydrogen chlorination or chlorination reaction of organic compounds, combustion in an incinerator, etc., may be used.

The concentration of hydrogen chloride in the gas containing hydrogen chloride is usually at least 10% by volume, preferably at least 50% by volume, more preferably at least 80% by volume. When the concentration of hydrogen chloride is less than 10% by volume, the separation of chlorine formed, and/or the recycling in the case of recycling unreacted oxygen may become complicated.

Components other than hydrogen chloride, which are contained in the gas containing hydrogen chloride, include aromatic chlorohydrocarbons (e.g. o-dichlorobenzene, monochlorobenzene, etc.), aromatic hydrocarbons (e.g. toluene, benzene, etc.), aliphatic chlorohydrocarbons (e.g. vinyl chloride, 1,2-dichloroethane, methyl chloride, ethyl chloride, propyl chloride, allyl chloride, etc.), aliphatic hydrocarbons (e.g. methane, acetylene, ethylene, propylene, etc.), and inorganic gasses (e.g. nitrogen, argon, carbon dioxide, carbon monoxide, phosgene, hydrogen, carbonyl sulfide, hydrogen sulfide, etc.).

In the course of the reaction of hydrogen chloride and oxygen, the aromatic chlorohydrocarbons and the aliphatic chlorohydrocarbons are oxidized to generate carbon dioxide, water and chlorine, the aromatic hydrocarbons and the aliphatic hydrocarbons are oxidized to generate carbon dioxide and water, carbon monoxide is oxidized to generate carbon dioxide, and phosgene is oxidized to generate carbon dioxide and chlorine.

As the gas containing oxygen, oxygen or an air is used. Oxygen may be produced by usual industrial methods such as a pressure-swing method of an air, deep-cooling separation of an air, etc.

While the theoretical molar amount of oxygen necessary for oxidizing one mole of hydrogen chloride is 0.25 mole, it is preferable to use oxygen in an amount exceeding the theoretical amount, and more preferably, 0.25 to 2 moles of oxygen is used per one mole of hydrogen chloride. When the amount of oxygen is too low, the conversion of hydrogen chloride may decrease. When the amount of oxygen is too high, it may be difficult to separate formed chlorine from unreacted oxygen.

In the present invention, preferably, the gas containing oxygen is divided into portions and introduced in at least two reaction zones each comprising a catalyst-packed layer, which are arranged in series.

One example of a method for introducing the gas containing oxygen with dividing it into portions is a method comprising introducing the whole volume of the gas containing hydrogen chloride and a part of the gas containing oxygen in the first reaction zone, and introducing the reaction mixture from the first reaction zone and the rest of the gas containing oxygen in the second reaction zone. Herein, the first reaction zone means a reaction zone in which the raw material gas is firstly introduced, while the second reaction zone means a reaction zone in which the raw material gas is introduced subsequent to the first reaction zone. The divided amount of the gas containing oxygen, which is introduced in the first reaction zone, is from 5 to 90%, preferably from 10 to 80%, more preferably from 30 to 60% based on the whole volume of the gas containing oxygen. When this divided amount is too low, it may be difficult to control the temperature in the second and subsequent reaction zones.

In the present invention, the temperature in at least one of the reaction zones should be controlled with the heat exchange system. Thereby, the excessive hot spot in the reaction zone is suppressed, and the reaction zone is effectively used, so that the stable activity of the catalyst is maintained and chlorine can be stably obtained at a high yield. Accordingly, the catalyst cost, the equipment cost, the operation cost, and the stability and easiness of the operation are maintained at the reasonable levels.

At least two reaction zones each comprising a catalyst-packed layer, which are arranged in series, can be formed by packing at least two kinds of the catalysts in a reactor, or by controlling the temperatures in at least two reaction zones independently. Here, the reaction zone comprising the catalyst-packed layer constitutes a fixed bed reactor, but neither a fluidized bed reactor nor a moving bed reactor.

To pack at least two kinds of the catalysts, the catalyst-packed layer in the tubular reactor is divided into at least two zones along the axis direction of the reactor and catalysts having different activities, compositions and/or particle sizes are packed in at least two zones respectively, or at least two portions of the catalyst are diluted with fillers consisting of the inactive material and/or the carrier at different dilution ratios and packed in at least two zones respectively, or the catalyst and the catalyst which is diluted with fillers consisting of the inactive material and/or the carrier are packed in at least two zones respectively.

When the catalyst is diluted with the fillers consisting of the inactive material and/or the carrier, the entire of the catalyst and the fillers consisting of the inactive material and/or the carrier means the reaction zone comprising the catalyst-packed layer.

In general, two successive reaction zones are directly in contact with each other, but the inactive material may be packed between the reaction zones. However, the layer packed with only the inactive material is not regarded as a reaction zone.

To independently control the temperatures in at least two reaction zones, at least two independent systems may be used to control the temperatures. In this case, at least one of the temperature-control systems should be the heat exchange system.

Herein, the heat exchange system means a system providing a jacket outside the tubular reactor, which is filled with the catalyst to remove the heat of reaction generated by the reaction with a heating medium in the jacket. With the heat exchange system, the temperature in the reaction zone comprising the catalyst-packed layer in the reactor can be controlled with the heating medium in the jacket. In the industrial process, a shell-and-tube heat exchanger type fixed bed multi-tube reactor may be used, in which tubular reactors, which are arranged in series and have the reaction zones comprising the catalyst-packed layer, are arranged in parallel, and a jacket is provided around the tubular reactors. Besides the heat exchange system, an electric furnace system may be used, but it has a problem such that the temperature control in the reaction zone(s) is difficult.

In the present invention, preferably, the temperatures of at least two reaction zones are controlled with the heat exchange systems. To this end, the heating media are independently circulated in the discrete jackets to independently control the temperatures of the respective reaction zones; or a jacket is divided into at least two sections with partitions and the heating media are independently circulated in the partitioned sections to control the temperatures of the reaction zones. The partitions may be directly fixed to the tubular reactors by welding, although a gap may be left between each partition and the tubular reactor to an extent that the heating media can be substantially independently circulated. The heating medium in the jacket is preferably flowed from the bottom to the top of the jacket so that the medium has no cavitation therein.

Preferably, the temperatures of all the reaction zones are controlled with the heat exchange systems, since the reaction heat is satisfactorily removed, and the stability and easiness of the operation are maintained.

Examples of the heating medium include molten salts, steam, organic compounds, molten metals, etc. Among them, the molten salt or steam is preferable from the viewpoint of the thermal stability and handling easiness, and the molten salt is more preferable from the viewpoint of the good thermal stability. The molten metal is expensive and difficult to handle. Examples of the composition of the molten salt include the mixture of 50% by weight of potassium nitrate and 50% by weight of sodium nitrite, the mixture of 53% by weight of potassium nitrate, 40% by weight of sodium nitrite and 7% by weight of sodium nitrate, etc. Examples of the organic compound include DOWTHERM A (the mixture of diphenyloxide and diphenyl), etc.

As the number of the reaction zone increases, the reaction zones can be more effectively used. From the industrial viewpoint, the number of the reaction zones is usually from 2 to 20, preferably from 2 to 8, more preferably from 2 to 4. When the number of the reaction zones is too large, the kinds of the catalysts packed may increase and/or the number of apparatuses to control the temperature increases so that the process may become less economical.

In the present invention, preferably, the ratio of the first reaction zone to the reaction zones comprising the catalyst-packed layers arranged in series is 70% by volume or less, more preferably 30% by volume or less. More preferably, the reaction zones are packed with substantially the catalyst only, the mixture of substantially the catalyst and the inactive material, the mixture of substantially the catalyst and the carrier, or the mixture of substantially the catalyst, the inactive material and the carrier so that the ratio of the first reaction zone is 70% by volume or less, more preferably 30% by volume or less and the temperature in the second reaction zone is usually at least 5° C. higher, preferably at least 10° C. higher than that in the first reaction zone; or that the ratio of the first reaction zone is 70% by volume or less, more preferably 30% by volume or less and the activity in the second reaction zone is usually at least 1.1 times higher, preferably at least 1.5 times higher than that in the first reaction zone; or that the ratio of the first reaction zone is 70% by volume or less, more preferably 30% by volume or less, the temperature in the second reaction zone is usually at least 5° C. higher, preferably at least 10° C. higher than that in the first reaction zone and the activity in the second reaction zone is usually at least 1.1 times higher, preferably at least 1.5 times higher than that in the first reaction zone. Herein, the activity in the reaction zone (mol-HCl/ml-reaction zone·min) means a value obtained by dividing the product of the hydrogen chloride reaction activity per a unit catalyst weight and a unit time (mol-HCl/g-catalyst·min) and the amount of the catalyst filled (g-catalyst) by the volume of the reaction zone (ml-reaction zone). The hydrogen chloride reaction activity per a unit catalyst weight and a unit time is calculated from the amount of chlorine generated when hydrogen chloride and oxygen are reacted by supplying 0.5 mole of oxygen per 1 mole of hydrogen chloride at a ratio of a catalyst volume to a supply rate of hydrogen chloride under the normal state (0° C., 0.1 MPa) in the range between 4,400 and 4,800 h$^{-1}$, under a reaction pressure of 0.1 MPa at a reaction temperature of 280° C.

In the first reaction zone, the reaction rate is high since the concentrations of the reactants, that is, hydrogen chloride and oxygen are high. Therefore, the hot spot is generated on the entrance side of the first reaction zone. On the other hand, the temperature at the exit of the first reaction zone is close to the temperature of a heating medium. When the ratio of the first reaction zone exceeds 70% by volume, a part of the catalyst-packed layer having a temperature close to that of the heating medium in the jacket increases, and thus the catalyst cannot be effectively used.

The catalyst used in the oxidation reaction according to the present invention may be any known catalyst that is used in the production of chlorine through the oxidation of hydrogen chloride. Examples of such a catalyst include catalysts comprising copper chloride, potassium chloride and various compounds as third components, catalysts comprising chromium oxide, catalysts comprising ruthenium oxide, etc. Among them, the catalysts comprising ruthenium oxide are preferable, and those comprising ruthenium oxide and titanium oxide are more preferable. The catalysts comprising ruthenium oxide are disclosed in JP-A-10-182104 and EP 936 184, and the catalyst comprising ruthenium oxide and titanium oxide are disclosed in JP-A-10-194705 and JP-A-10-338502. The amount of ruthenium oxide in the catalyst is preferably from 0.1 to 20% by weight. When the amount of ruthenium oxide is too low, the catalytic activity may be low and thus the conversion of hydrogen chloride may decrease. When the amount of ruthenium oxide is too high, the catalyst may become too expensive.

The shape of the catalyst may be any of conventionally used shapes such as a spherical particle, a cylindrical pellet, an extruded form, a ring form, a honeycomb form, or a granule having a suitable size which is produced by milling of a molded material and sieving thereof. The size of the catalyst is preferably 10 mm or less. When the size of the catalyst exceeds 10 mm, the catalytic activity may deteriorate. Although the lower limit of the size of the catalyst may not be limited, the size of the catalyst is at least 0.1 mm, since a pressure loss in the catalyst-packed layer increases if the size is too small. Herein, the size of the catalyst means a diameter of a sphere in the case of the spherical particle, a diameter of a cross section in the case of the cylindrical pellet, or the largest size of the cross section in the case of other forms.

In the present invention, the reaction zones are preferably packed with substantially the catalyst only, the mixture of substantially the catalyst and the inactive material, the mixture of substantially the catalyst and the carrier, or the mixture of substantially the catalyst, the inactive material and the carrier so that the thermal conductivity becomes highest in the first reaction zone, more preferably, so that the thermal conductivity in the reaction zones successively decreases from the first reaction zone to the last reaction zone along the direction of the gas flow.

Here, the last reaction zone means a reaction zone into which the raw material gas is lastly supplied. The thermal conductivity of the reaction zone means that of the materials packed in the reaction zone.

In the reaction zone on the entrance side of the raw materials, the reaction rate is high and the amount of heat generated by the oxidation reaction is large, since the concentrations of hydrogen chloride and oxygen are high. Accordingly, the excessive hot spot in the catalyst-packed layer can be suppressed when the catalyst having the relatively high thermal conductivity is filled in the reaction zone(s) on the entrance side.

In the present invention, the reaction zones are preferably packed with substantially the catalyst only, the mixture of substantially the catalyst and the inactive material, the mixture of substantially the catalyst and the carrier, or the mixture of substantially the catalyst, the inactive material and the carrier so that the activities of the reaction zones successively increase from the first reaction zone to the last reaction zone along the direction of the gas flow. Thereby, the temperature difference between the adjacent reaction zones decreases and thus the operation can be easily maintained stable.

In the present invention, the reaction zones are preferably packed with substantially the catalyst only, the mixture of substantially the catalyst and the inactive material, the mixture of substantially the catalyst and the carrier, or the mixture of substantially the catalyst, the inactive material and the carrier so that the activity of the last reaction zone is higher than that of the reaction zone immediately preceding the last reaction zone and the hot spot in the last reaction zone is made lower than that in the reaction zone immediately preceding the last reaction zone. When the activity of the last reaction zone is lower than that of the reaction zone immediately preceding the last reaction zone, and the hot spot in the last reaction zone is higher than that in the reaction zone immediately preceding the last reaction zone, the conversion of hydrogen chloride may decrease due to the chemical equilibrium composition, since the reaction to convert hydrogen chloride to chlorine and water through the oxidization of hydrogen chloride with oxygen is an equilibrium reaction.

In general, the amount (volume) of the catalyst used is selected so that a ratio of the volume to the supply rate of hydrogen chloride under the normal state (GHSV) is from 10 to 20,000 h$^{-1}$.

The direction of flowing the raw materials in the reaction zone is not limited, and the upward or downward stream may be employed.

A reaction pressure is usually from 0.1 to 5 MPa. A reaction temperature is preferably from 200 to 500° C., more preferably from 200 to 380° C. When the reaction temperature is too low, the conversion of hydrogen chloride may decrease. When the reaction temperature is too high, the catalyst component may volatilize.

The gas temperature at the exit of the last reaction zone is preferably in the range between 200 and 350° C., more preferably in the range between 200 and 320° C. When the gas temperature at the exit of the last reaction zone exceeds 350° C., the conversion of hydrogen chloride may decrease due to the chemical equilibrium composition, since the reaction to convert hydrogen chloride to chlorine and water through the oxidization of hydrogen chloride with oxygen is an equilibrium reaction.

In the process of the present invention, the superficial linear velocity of the gas in a column is preferably from 0.2 to 10 m/sec., more preferably from 0.2 to 5 m/sec. When the linear velocity of the gas is too low, the excessive number of the tubular reactors is necessary to attain the satisfactory throughput of hydrogen chloride with the industrial scale reaction apparatus. When the linear velocity of the gas is too high, the pressure loss in the catalyst-packed layer may increase. Herein, the superficial linear velocity of the gas in the column means a ratio of the total supply rate of all the gases supplied in the catalyst-packed layer under the normal state (0° C., 0.1 MPa) to the cross sectional area of the tubular reactor.

The inner diameter of the tubular reactor is usually from 10 to 50 mm, preferably from 10 to 40 mm, more preferably from 10 to 30 mm. When the inner diameter of the tubular reactor is too small, the excessive number of the tubular reactors may be required to achieve the satisfactory throughput of hydrogen chloride with an industrial scale reaction apparatus. When the inner diameter of the tubular reactor is too large, the excessive hot spot may be formed in the catalyst-packed layer.

The ratio of the inner diameter (D) of the tubular reactor to the size (d) of the catalyst (D/d) is usually from 5/1 to 100/1, preferably from 5/1 to 50/1, more preferably from 5/1 to 20/1. When the ratio D/d is too small, the excessive hot spot may be formed in the catalyst-packed layer. When this ratio is too large, the pressure loss in the catalyst-packed layer may increase.

EXAMPLES

The present invention will be illustrated by the following Examples.

Example 1

As a reactor, a fixed bed reactor was used, which consisted of a tubular reactor (with a sheath tube for temperature measurement having an outer diameter of 5 mm) having an inner diameter of 18 mm and a length of 1 m and was equipped with a jacket using a molten salt (potassium nitrate/sodium nitrite=1/1 by weight) as a heating medium.

In the upper part of the reactor, 80.2 g (60.0 ml) of an extruded catalyst comprising 6.6 wt. % of ruthenium oxide supported on $\alpha$-Al$_2$O$_3$ having a diameter of 1.5 mm was packed to form the first reaction zone. The catalyst was reused after using it in the oxidation reaction of hydrogen chloride for about 260 hours.

Below the first reaction zone, the mixture of 35.9 g (35.6 ml) of a spherical catalyst comprising 6.6 wt. % of ruthenium oxide supported on anatase crystal TiO$_2$ having a diameter of 1 to 2 mm and 37.6 g (17.8 ml) of $\alpha$-Al$_2$O$_3$ particles having a diameter of 2 mm (SSA 995 manufactured by NIKKATO Co., Ltd.), which had been well mixed, was packed to form the second reaction zone.

The packed lengths of the catalysts were 0.280 m in the first reaction zone, and 0.235 m in the second reaction zone. The packed volumes of the catalyst were 66 ml in the first reaction zone and 55 ml in the second reaction zone, and the volume ratio of the first reaction zone was calculated to be 54% by volume.

The extruded catalyst comprising 6.6 wt. % of ruthenium oxide supported on $\alpha$-Al$_2$O$_3$ having a diameter of 1.5 mm was produced as follows:

Commercially available $\alpha$-Al$_2$O$_3$ powder (AES-12 manufactured by Sumitomo Chemical Co., Ltd.), ruthenium chloride, pure water and alumina sol (Alumina Sol 200 manufactured by Nissan Chemical Co., Ltd.) were well mixed. To the mixture, dry air was blown at room temperature to dry the mixture until it had a suitable viscosity. The mixture was extruded in the form of pellets having a diameter of 1.5 mm. Then, the pellets were dried in an air at 60° C. for 4 hours. The obtained solid was heated from room temperature to 350° C. over one hour, and calcined at the same temperature for 3 hours to obtain the extruded catalyst comprising 6.6 wt. % of ruthenium oxide supported on $\alpha$-Al$_2$O$_3$ having a diameter of 1.5 mm.

The spherical catalyst comprising 6.6 wt. % of ruthenium oxide supported on anatase crystal TiO$_2$ having a diameter of 1 to 2 mm was produced according to the method described in JP-A-10-338502.

The extruded catalyst comprising 6.6 wt. % of ruthenium oxide supported on $\alpha$-Al$_2$O$_3$ used in this Example had a hydrogen chloride reaction activity per a unit catalyst weight and a unit time of $1.3 \times 10^{-4}$ mol-HCl/g-cat.·min., which was measured as follows:

In a Pyrex glass tubular reactor having an inner diameter of 14 mm (with a sheath tube for temperature measurement having an outer diameter of 4 mm), 4.0 g (3.3 ml) of the catalyst was packed, and the reactor was placed in a molten salt bath at 280° C. Then, hydrogen chloride and oxygen were downwardly passed through the reactor from its top to its bottom at flow rates of 0.26 l/min. (normal state) and 0.13 l/min. (normal state) respectively. After 1.5 hours, the exit gas was collected in an aqueous solution of potassium iodide so that generated chlorine, unreacted hydrogen chloride and generated water were absorbed in the solution, and the amount of chlorine generated and the amount of unreacted hydrogen chloride were measured with the iodometry and the neutralization titration, respectively.

The spherical catalyst comprising 6.6 wt. % of ruthenium oxide supported on anatase crystal TiO$_2$ had a hydrogen chloride reaction activity per a unit catalyst weight and a unit time of $4.8 \times 10^{-4}$ mol-HCl/g-cat.·min., which was measured in the same manner as in the case of the extruded catalyst comprising 6.6 wt. % of ruthenium oxide supported on $\alpha$-Al$_2$O$_3$ except that the amount of the catalyst was 1.9 g (2.0 ml), and the flow rates of oxygen and hydrogen chloride were 0.16 l/min. (normal state) and 0.08 l/min. (normal state), respectively.

The activity in the first reaction zone was $1.6 \times 10^{-4}$ mol-HCl/ml-reaction zone·min., while that in the second reaction zone was $3.1 \times 10^{-4}$ mol-HCl/ml-reaction zone·min.

Hydrogen chloride-containing gas (hydrogen chloride: 99% volume or more) and oxygen (oxygen: 99% by volume) were supplied downwardly in the Ni reactor from its top to its bottom at a flow rate of 6.1 l/min. (normal state) and 3.05 l/min. (normal state) respectively and reacted while maintaining the temperature of the molten salt in the jacket at 326° C. The superficial linear velocity of the gas was 0.65 m/sec. by calculation. In the first reaction zone, the reaction temperatures were 332° C. at the entrance, 335° C. at the exit, and 347° C. at the hot spot. In the second reaction zone, the reaction temperatures were 335° C. at the entrance, 338° C. at the exit, and 344° C. at the hot spot.

The exit gas from the second reaction zone was collected in an aqueous solution of potassium iodide so that generated chlorine, unreacted hydrogen chloride and generated water were absorbed in the solution. Then, the amount of chlorine generated and the amount of unreacted hydrogen chloride were measured with the iodometry and the neutralization titration, respectively. The conversion of hydrogen chloride to chloride was 30.6%.

Example 2

As a reactor, a fixed bed reactor was used, which consisted of one nickel tubular reactor (with a sheath tube for temperature measurement having an outer diameter of 6 mm) having an inner diameter of 26 mm and a length of 2.0 m and equipped with an electric furnace, and two tubular reactors (each having a sheath tube for temperature measurement having an outer diameter of 6 mm) having an inner diameter of 18 mm and a length of 2.5 m which was equipped with a jacket using a molten salt (potassium nitrate/sodium nitrite=1/1 by weight) as a heating medium. The three reactors were connected in series.

In the tubular reactor having the inner diameter of 26 mm, the mixture of 69 g (60 ml) of an extruded catalyst comprising 6.6 wt. % of ruthenium oxide supported on $\alpha$-$Al_2O_3$ having a diameter of 1.5 mm and 132 g (60 ml) of $\alpha$-$Al_2O_3$ particles having a diameter of 2 mm, which had been well mixed, was packed to form the first reaction zone.

In the first tubular reactor having an inner diameter of 18 mm, the mixture of 300 g (300 ml) of a spherical catalyst comprising 6.6 wt. % of ruthenium oxide supported on anatase crystal $TiO_2$ having a diameter of 1 to 2 mm and 340 g (150 ml) of $\alpha$-$Al_2O_3$ particles having a diameter of 2 mm, which had been well mixed, was packed to form the second reaction zone.

In the second tubular reactor having an inner diameter of 18 mm, 297 g (294 ml) of a spherical catalyst comprising 6.6 wt. % of ruthenium oxide supported on anatase crystal $TiO_2$ having a diameter of 1 to 2 mm was packed to form the third reaction zone.

The packed lengths of the catalysts were 0.21 m in the first reaction zone, 1.98 m in the second reaction zone, and 1.37 m in the third reaction zone. The packed volumes of the catalysts were 103 ml in the first reaction zone, 447 ml in the second reaction zone, and 309 ml in the third reaction zone. The volume ratio of the first reaction zone was calculated to be 12% by volume.

The extruded catalyst comprising 6.6 wt. % of ruthenium oxide supported on $\alpha$-$Al_2O_3$ was produced in the same manner as in Example 1, and it had a hydrogen chloride reaction activity per a unit catalyst weight and a unit time of $2.5 \times 10^{-4}$ mol-HCl/g-cat.·min., which was measured in the same manner as in Example 1 except that the amount of the catalyst was 4.0 g (3.5 ml).

The activities in the reaction zones were $1.7 \times 10^{-4}$ mol-HCl/ml-reaction zone·min. in the first reaction zone, $3.2 \times 10^{-4}$ mol-HCl/ml-reaction zone·min. in the second reaction zone, and $4.6 \times 10^{-4}$ mol-HCl/ml-reaction zone·min. in the third reaction zone.

Hydrogen chloride-containing gas (hydrogen chloride: 99% volume or more), oxygen (oxygen: 99% by volume) and a gas comprising unreacted oxygen from which chlorine had been removed (oxygen: 86.0% by volume, chlorine: 8.9% by volume (calculated), nitrogen: 2.3% by volume, argon: 2.7% by volume, carbon dioxide: 0.1% by volume) were supplied downwardly in the Ni reactor from its top to its bottom at a flow rate of 6 l/min. (normal state), 1.13 l/min. (normal state) and 2.15 l/min. (normal state) respectively and reacted under a pressure at the entrance of the reactor of 1.19 kg/cm$^2$-G (0.22 MPa) while maintaining the temperature of the electric furnace at 342° C. and the temperatures of the molten salt in the jackets at 345° C. and 332° C. The superficial linear velocities of the gas were 0.31 m/sec. in the reactor having an inner diameter of 26 mm and 0.68 m/sec. in the reactors having the inner diameter of 18 mm by calculation. The reaction temperatures in the first reactor were 322° C. at the entrance, 343° C. at the exit, and 344° C. at the hot spot. The reaction temperatures in the second reactor were 336° C. at the entrance, 348° C. at the exit, and 362° C. at the hot spot. The reaction temperatures in the third reactor were 325° C. at the entrance, 338° C. at the exit, and 350° C. at the hot spot.

The gas obtained by the reaction was cooled and then fed to an absorption tower, which was equipped with a tank for pure water, a pump for feeding pure water, a pump for feeding 20 wt. % hydrochloric acid and a pump for circulating hydrochloric acid in the tower. The pure water was fed in the tank for pure water with the pump for feeding pure water at a rate of 15 kg/h (29° C.), and allowed in contact with the gas recovered from the top of the absorption tower in the tank for pure water before it was fed to the absorption tower. Then, the pure water was fed to the bottom of the absorption tower from the tunk by overflowing. 20 Wt. % hydrochloric acid was fed to the top of the absorption tower at a rate of 0.355 kg/hr (29° C.) with the pump for feeding 20 wt. % hydrochloric acid so that hydrochloric acid was in contact with the gas in a countercurrent manner. The solution of hydrochloric acid comprising hydrogen chloride and water in the tower was circulated to the top of the absorption tower with a circulation pump and allowed in contact with the gas in the countercurrent manner. This solution was recovered from the exit of the circulation pump at a rate of 0.736 kg/hr. From the top of the tower, the gas of atmospheric pressure was obtained at 28° C.

The gas obtained from the top of the absorption tower was supplied to a drying tower with sulfuric acid. The drying tower was equipped with a pump for feeding sulfuric acid. In the drying tower, 98 wt. % sulfuric acid was fed at a rate of 0.145 kg/hr. with the pump for feeding sulfuric acid, and the sulfuric acid in the tower was recovered at a rate of 0.172 kg/hr. by overflowing. After separating mists from the resulting dried gas (containing water of less than 0.05 ml/l) with a mist-separator, the gas was fed to a compressor to pressurize it to 9.25 kg/cm$^2$-G (1.01 MPa) and then cooled to –20° C. so that it was separated to a liquid comprising chlorine, and a gas comprising unreacted oxygen.

The obtained chlorine contained 98.5% by volume of chlorine (calculated), 1.1% by volume of oxygen, 0.17% by volume of nitrogen, 0.07% by volume of argon and 0.09% by volume of carbon dioxide. The gas comprising unreacted oxygen was recycled to the reaction.

EFFECTS OF THE INVENTION

As explained in the above, according to the present invention, the excessive hot spot in the catalyst-packed layer is suppressed and thus the catalyst-packed layer can be effectively used in the process for producing chlorine comprising oxidizing hydrogen chloride in a gas containing hydrogen chloride with a gas containing oxygen. Therefore, the activity of the catalyst is maintained stable, and chlorine can be stably obtained at a high yield. Accordingly, the process of the present invention is an advantageous process for producing chlorine from the viewpoint of a catalyst cost, an equipment cost, an operation cost, and the stability and easiness of the operation.

What is claimed is:

1. A process for producing chlorine comprising the step of oxidizing hydrogen chloride in a gas containing hydrogen chloride with a gas containing oxygen in the presence of a catalyst, wherein the oxidation of hydrogen chloride is carried out in at least two reaction zones each comprising a catalyst-packed layer, which are arranged in series, and a temperature in at least one of said reaction zones is controlled with a heat exchange system, which provides a jacket outside said at least one of said reaction zones, wherein said jacket contains a heating medium that removes the heat of reaction generated by the reaction in said at least one of said reaction zones; and wherein said gas containing hydrogen chloride and said gas containing oxygen are simultaneously introduced in at least the first reaction zone,
wherein at least two reaction zones each comprising a catalyst-packed layer, which are arranged in a series, are formed by packing at least two kinds of catalysts in a tubular reactor; and/or by independently controlling the temperatures of said at least two reaction zones.

2. The process according to claim 1, wherein the temperatures in at least two reaction zones are controlled with a heat exchange system.

3. The process according to claim 1, wherein the temperatures in all the reaction zones are controlled with a heat exchange system.

4. The process according to claim 1, wherein the ratio of the first reaction zone, in which said gas containing hydrogen chloride and said gas containing oxygen are firstly supplied among at least two reaction zones each comprising a catalyst-packed layer, which are arranged in series, is 70% by volume or less based on the total volume of all the reaction zones.

5. The process according to claim 1, wherein the reaction zones are packed with substantially the catalyst only, a mixture of substantially the catalyst and an inactive material, a mixture of substantially the catalyst and a carrier, or a mixture of substantially the catalyst, the inactive material and the carrier so that the thermal conductivity becomes highest in the first reaction zone.

6. The process according to claim 1, wherein the reaction zones are packed with substantially the catalyst only, a mixture of substantially the catalyst and an inactive material, a mixture of substantially the catalyst and a carrier, or a mixture of substantially the catalyst, the inactive material and the carrier so that the thermal conductivity in the reaction zones successively decreases from the first reaction zone to the last reaction zone along the direction of the gas flow.

7. The process according to claim 1, wherein the reaction zones are packed with substantially the catalyst only, a mixture of substantially the catalyst and an inactive material, a mixture of substantially the catalyst and a carrier, or a mixture of substantially the catalyst, the inactive material and the carrier so that the activities of the reaction zones successively increase from the first reaction zone to the last reaction zone along the direction of the gas flow.

8. The process according to claim 1, wherein a gas temperature at the exit of the last reaction zone is in the range between 200 and 350° C.

9. The process according to claim 1, wherein a superficial linear velocity of the gas in the column is from 0.2 to 10 m/sec.

10. The process according to claim 1, wherein the volume of the gas containing oxygen is divided and supplied in the reaction zones.

11. The process according to claim 1, wherein oxygen is used in an amount of 0.25 to 2 moles per one mole of hydrogen chloride.

12. The process according to claim 1, wherein the mixed gas of hydrogen chloride and oxygen containing at least 66.7% of hydrogen chloride is introduced in the first reaction zone.

* * * * *

UNITED STATES PATENT AND TRADEMARK OFFICE
CERTIFICATE OF CORRECTION

PATENT NO. : 6,977,066 B1
DATED : December 20, 2005
INVENTOR(S) : Tetsuya Suzuta et al.

It is certified that error appears in the above-identified patent and that said Letters Patent is hereby corrected as shown below:

<u>Column 12,</u>
Line 26, delete Claim 12.

Signed and Sealed this

Eighteenth Day of April, 2006

JON W. DUDAS
*Director of the United States Patent and Trademark Office*